Dec. 31, 1957 A. GANDELLI ET AL 2,817,876
CONTINUOUSLY OPERABLE WORM PRESS FOR DEAERATING PASTY MASSES
Filed Feb. 7, 1955 3 Sheets-Sheet 1
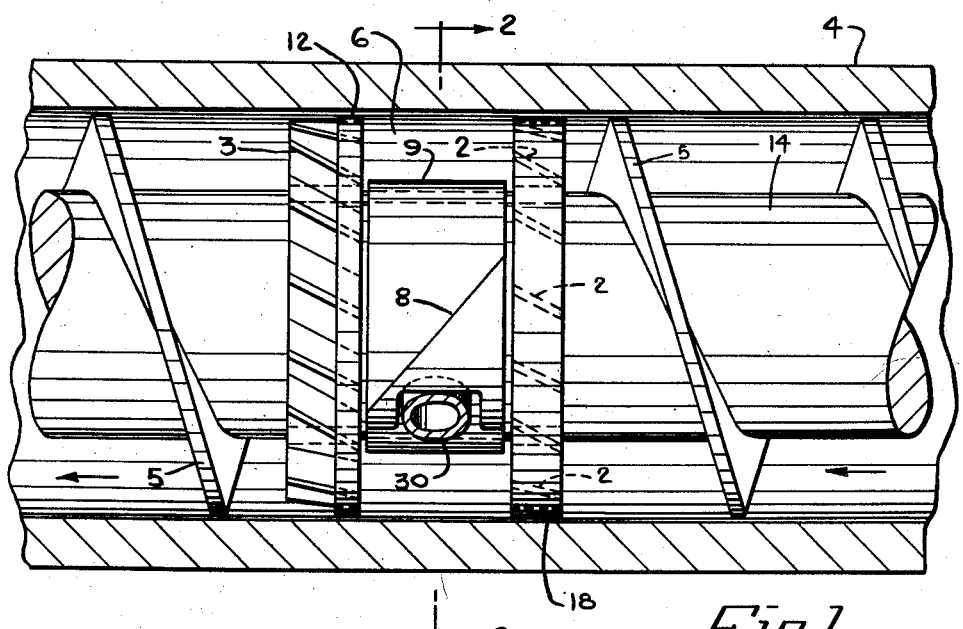
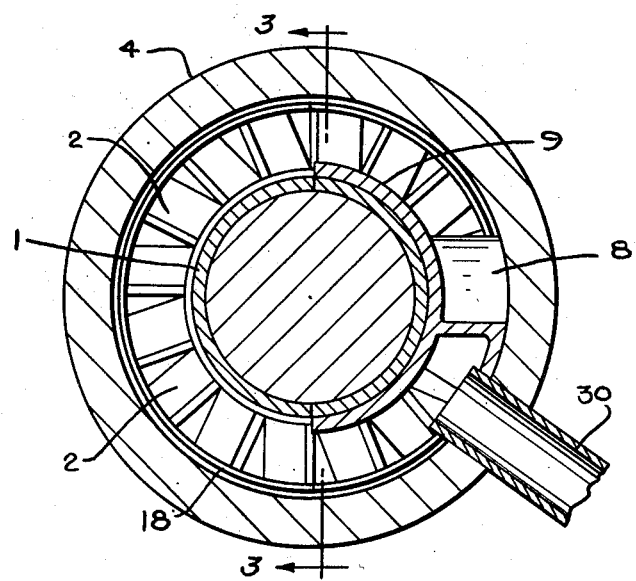
INVENTORS
AMOS GANDELLI &
AMEDEO DE POLO
BY
THEIR AGENTS.

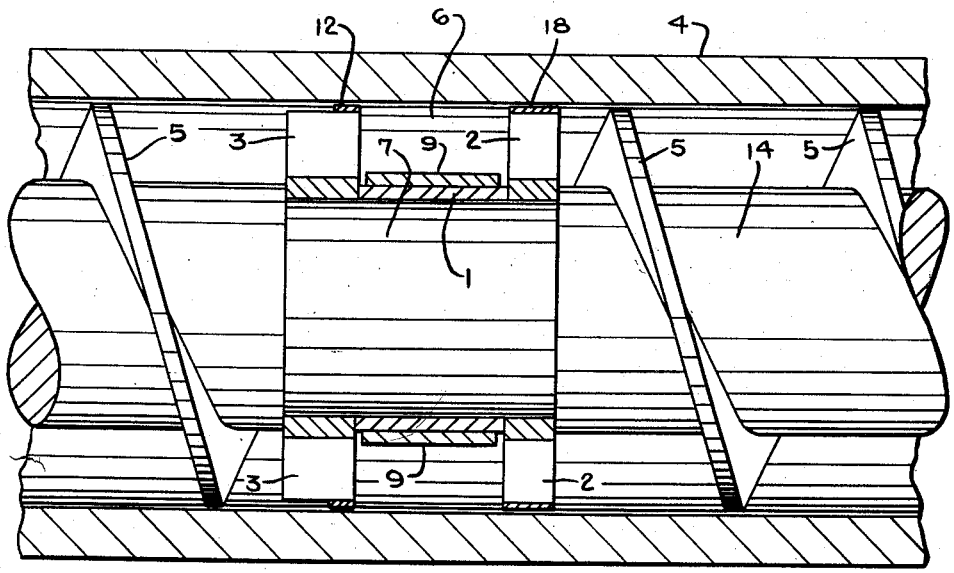
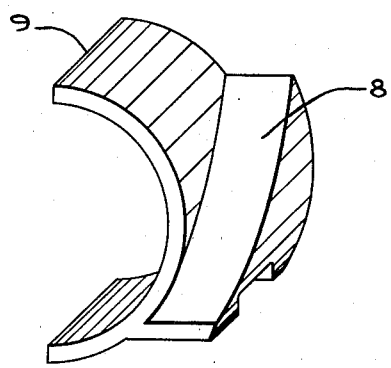

United States Patent Office 2,817,876
Patented Dec. 31, 1957

2,817,876

CONTINUOUSLY OPERABLE WORM PRESS FOR DEAERATING PASTY MASSES

Amos Gandelli and Amedeo De Polo, Treviso, Italy, assignors to Gebrueder Buehler, Uzwil, Switzerland Application February 7, 1955, Serial No. 486,636

Claims priority, application Italy February 11, 1954

10 Claims. (Cl. 18—12)

The invention relates to the treatment and particularly the loosening of pasty masses, for instance alimentary pastes, plastics, clay, soap, chocolate in worm presses and particularly continuously operable worm presses.

An important requirement of this treatment is the deaeration of these masses which is performed during a breaking-up and compression period, whereby the escape of gases is facilitated.

In the customary worm presses of the above indicated type a vacuum chamber is provided between a mixing trough and a pressure worm.

The pasty masses are conveyed from the mixing trough by the transport worm and through a perforated plate into the vacuum chamber and from here further transported by the worm. The tightness of the vacuum chamber is secured by the pasty mass itself which at one side enters the vacuum chamber through a perforated plate and at the other side is compressed by the pressing worm.

This device, however, necessitates the provision of a second worm for the conveyance of the pasty masses, which leads to a complicated construction.

With another worm press for pasty masses the vacuum or deaerating chamber is located between a front and a rear section of the pressure worm. The vacuum chamber is confined at opposite sides by perforated plates which are fixedly located in a casing.

The air-tightness of this vacuum chamber is secured by the pasty mass itself which is entered into the vacuum chamber through the perforated plates.

Since in this case a transport worm is not required the operation of the press is simplified; however, and in order to obtain a satisfactory functioning of the worm press a complicated casing must be used to create a symmetrically disposed operating chamber.

The main object of this invention is the creation of a worm press which eliminates the above described drawbacks of the art and enables in a surprisingly efficient manner the breaking-up and loosening of the pasty masses such as alimentary pastes, chocolate, soap and clay during their transport through a continuously operable worm press as well as the simultaneous removal of gases from these materials.

A further important characteristic of the invention is the avoidance of positive mechanical action during the loosening and deaeration of the pasty materials as heavy mechanical action might have a destructive influence upon the physical quality of the pastes and their structure.

It is a further object of the invention to provide means whereby an ordinary worm press can be easily transformed into a vacuum worm press.

With these objects in view the invention will now be described in detail and with reference to the attached drawings, wherein:

Fig. 1 is a vertical sectional elevation of the worm press;

Fig. 2 is a vertical sectional view on line 2—2 of Fig. 1;

Fig. 3 is a vertical longitudinal sectional view on line 3—3 of Fig. 2;

Fig. 4 is a perspective view of a constructional detail;

Figure 5:
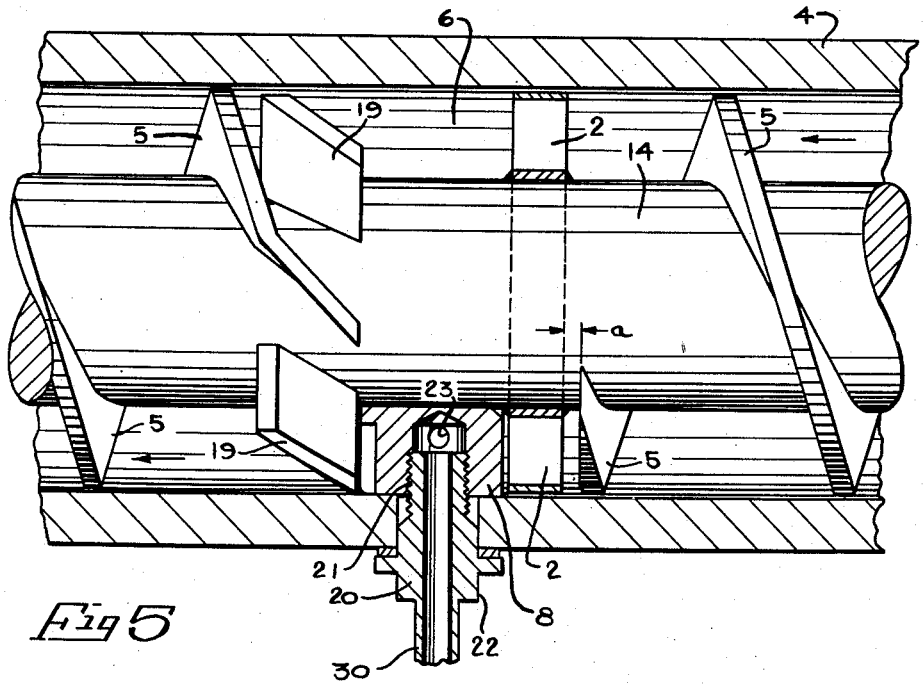
Fig. 5 is a vertical sectional view similar to that of Fig. 1 of a further modification of the worm press.

The worm press shown in the drawing and serving the deaeration and the loosening of pasty materials has a tubular outer casing 4. This casing accommodates a rotatable worm consisting of a worm shaft 14 and of a helical flange 5 carried by said shaft for the transport of the pasty materials through casing 4 in a direction from the right to the left side thereof and indicated by arrows.

As apparent from the drawings the continuity of flange 5 is interrupted for a certain distance whereby a flange-free portion of the worm results. This flange-free portion of the worm carries a sleeve 1, Figs. 2, 3, preferably composed of two halves; this sleeve 1 carries a circular row of inlet blades 2 for the transport of the materials to be treated into a chamber 6 and a row of outlet blades 3 for their removal from the chamber, see Figs. 1, 2. The blades 2 of the blade inlet row are secured in their operative position by outer ring 18, Fig. 3; the blades of the blade outlet row 3 are connected by a shorter outer ring 12, Fig. 3.

The two rows of blades 2, 3, which extend up to the inner face of casing 4, are placed at a mutual distance from each other and form with casing 4 an annular chamber 6 wherein by means of deaerating tube 30 a vacuum is maintained.

The blade-free portion of the worm shaft 14 located in chamber 6 carries a wedge or cutter 8 with an oblique surface, provided with a half circular shoe 9, Fig. 4; this member 8 is adapted to influence and change the flow direction of the pasty materials conducted through chamber 6.

Prior to the entrance of the charge into the operative range of the row of inlet blades 2 the movement of the pasty materials entered into casing 4 is substantially axial. This axial movement is the result of the combined rotation of the blades 2 and the movement of the pasty materials relatively to the blades. Upon leaving the inlet row of blade 2 the rod-shaped pasty bodies revolve with said inlet row of blades until they hit upon the wedge 8 which separates and transports them to the outlet row of blades 3.

As apparent from Fig. 2 the worm and inlet row of blades rotates clockwise. At the wedge 8 the material cannot be extruded, however, and hereafter the extrusion of the rod-shaped bodies commences rotating with the inlet row of blades 2; these rod-shaped paste bodies increase in length until they hit upon the wedge 8 which cuts them at the same time a change to a downward flow direction of these pasty rods is brought about by this member 8 during their passage through chamber 6.

By the action of the flow direction changing member 8 the pasty consistence of the rod-shaped components of the charge is loosened.

To assist the axial movement of the pasty masses the blades 2, 3 of the inlet row and of the outlet row of blades are inclined relative to the axis of worm shaft 14.

The wedge 8 is pushed against suction pipe 30 by the pasty mass in the vacuum chamber 6 and comes to rest on the deaerating pipe 30 during the rotation of the worm 14. By placing the suction pipe on that side of the wedge 8 which is free from and not in contact with the pasty mass a hollow space is formed so that the suction pipe will not get clogged.

In the embodiment of the invention shown in Fig. 5 the inlet row of blades 2 has the same shape as described above.

The outlet row of blades 19 are welded to the worm shaft 14. One of these blades forms a prolongation of the helical flange 5. To secure the wedge 8, which in this case is a massive part, the connecting part 20 of the suction pipe 30 is provided with a threaded portion 21 which presses the member 8 against the casing 4. In order to tighten the connecting member 20 the same is provided with a hexagonal surface 22. A bore 23 in member 8 connects the suction pipe 30 with the side of member 8 which is not in contact with the pasty mass.

A particularly satisfactory vacuum tightness of the vacuum chamber 6 is obtained when a layer of pasty mass of sufficient thickness is produced before the inlet row of blades 2. To assist the formation of such a layer it is useful to provide a free space, see Fig. 5, equal to distance "a" between the helical flange 5 and the row of blades 2; the distance "a" should be equal to at least 10 millimeters if alimentary paste is treated.

For operational reasons it may be necessary to change the output of the press. In this case difficulties may arise with regard to the function of the deaerating device because the pressure of the pasty mass before the row of inlet blades 2 may not be sufficient to maintain the vacuum tightness of the vacuum chamber 6.

Figure 6:
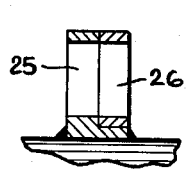
Fig. 6 is a sectional view of a constructional detail.

To remedy this difficulty a supplementary resistance to the flow of the charge at the row of inlet blades 2 must be applied. In conformity with a particular embodiment of this remedy, which is shown in Fig. 6, the inlet blades 2 are divided into two parts 25, 26; these two parts are rotatable relative to each other.

Figures 7, 8:
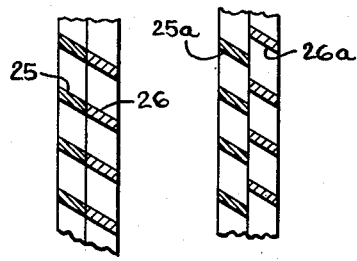
Figs. 7, 8 and 9 are sectional views of further embodiments of the inlet blades used in connection with this invention.

In a press having a large output the blades of the two parts 25, 26 remain aligned, see Fig. 7; in a press with a small output the blades of the two parts 25a, 26a are staggered, see Fig. 8.

Figure 9:
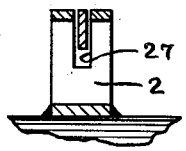

Another means for increasing the resistance to the flow at the inlet row of the blades 2 is shown in Fig. 9.

A slot 27 is provided in the row of the inlet blades 2, adapted to receive the ring 25; the latter may consist of two halves which are welded or screwed together. The outer diameter of the ring 28 corresponds to the outer diameter of the row of inlet blades 2 and the inner diameter of this ring is chosen in accordance with the resistance to the material flow.

Since certain changes in carrying out the above invention could be made without departing from the scope thereof, it is intended that all matter contained in the above description or shown in the accompanying drawings shall be interpreted as illustrative and not in a limiting sense.

It is accordingly desired that in construing the breadth of the appended claims they shall not be limited to the specific exemplifications of the invention described herein.

Having thus described the invention, what we claim as new and desire to be secured by Letters Patent, is as follows:

1. A continuously operable worm press for loosening and deaerating pastes, such as alimentary pastes, soap, clay, chocolate and plastic masses, said worm press comprising a cylindrical casing, a worm composed of a center shaft and a helical flange applied to said shaft, said worm being rotatably located in said cylindrical casing, said helical flange being interrupted for a certain length whereby a flange-free part of said worm and in combination with said casing a circular chamber surrounding said flange-free worm section is created, a circumferential row of consecutive inlet blades for said pastes fastened upon said worm at the paste entrance side of said circular chamber to divide the paste into rods and a row of consecutive outlet blades fastened upon said worm shaft at the exit side from said chamber, a deaerating tube connected with said chamber and a wedge located in said chamber upon said worm shaft between said two blade rows to cut said paste composed rods, to change this flow direction and to convey the same to the row of outlet blades, the blades constituting said two blade rows being inclined relatively to the worm axis.

2. In a continuously operable worm press, as claimed in claim 1, said blade rows being circumferentially united by an outer ring.

3. In a continuously operable worm press, as claimed in claim 1, a blade selected from the row of outlet blades forming an extension of the helical flange.

4. In a continuously operable worm press, as claimed in claim 1, a circular shoe attached to said wedge to center the latter in its operative position in said chamber.

5. In a continuously operable worm press, as claimed in claim 1, said deaerating tube being attached to said circular chamber and serving to operate said wedge in its securing position.

6. A continuously operable worm press according to claim 1, the inlet end of said helical flange and the inlet row of the blades being spaced at a distance from each other.

7. In a continuously operable worm press according to claim 6, the inlet end portion of said helical flange and the inlet row of the blades being spaced from each other at a distance of at least 10 millimeters.

8. In a continuously operable worm press according to claim 1, means located at the row of the inlet blades and adapted upon reduction of the press output to create an additional resistance to the flow of the paste.

9. In a continuously operable worm press according to claim 1, the blades of the inlet row being sub-divided by a plane perpendicularly extending to the worm shaft into two parts, the latter being adapted to be rotated relatively to each other.

10. In a continuously operable vacuum press according to claim 1, the blades of the inlet row being provided with peripheral slots and having circumferential rings located in said slots.

References Cited in the file of this patent

UNITED STATES PATENTS

| | | |
|---|---|---|
| 1,964,266 | McElroy et al. | June 26, 1934 |
| 2,378,539 | Dawihl | June 19, 1945 |
| 2,617,167 | Johnson | Nov. 11, 1952 |

FOREIGN PATENTS

| | | |
|---|---|---|
| 435,210 | Great Britain | Sept. 17, 1935 |
| 514,444 | Great Britain | Nov. 8, 1939 |
| 37,094 | Netherlands | Dec. 16, 1935 |
| 38,009 | Netherlands | Apr. 15, 1936 |